Jan. 7, 1941.    D. S. BRUCE ET AL    2,227,424
FRICTION MATERIAL
Filed Oct. 25, 1935

INVENTORS.
DONALD S. BRUCE.
RALPH T. HALSTEAD.
BY D. N. Halstead
ATTORNEY.

Patented Jan. 7, 1941

2,227,424

UNITED STATES PATENT OFFICE 2,227,424

FRICTION MATERIAL

Donald S. Bruce and Ralph T. Halstead, Somerville, N. J., assignors to Johns-Manville Corporation, New York, N. Y., a corporation of New York Application October 25, 1935, Serial No. 46,733

7 Claims. (Cl. 260—3)

This invention relates to a friction composition and element and particularly to a friction material comprising reenforcing fibres and a binder composition therefor, of high coefficient of friction and high resistance to excessive softening or fading at an elevated temperature.

Friction materials suitable for brake lining or the like that are in wide use comprise, ordinarily, asbestos fibres and a friction compound that is frequently a rubber composition.

There has long been need of a satisfactory method of increasing the coefficient of friction of such materials. When there is used the expedient of adding abrasives to increase the friction, there is introduced objectionable scoring of the brake drum or other element against which the friction material during use is applied. When there is used the other common alternative, namely, increasing the proportion of rubber compound or the like, there results an article that undergoes excessive softening at high temperatures, as, for example, in an automotive brake band being subjected to severe usage. This property of softening of the friction compound is commonly referred to as fading and is indicated by decrease in holding power or friction of the brake.

It is an object of the present invention to provide a friction composition that is satisfactory from the standpoints both of scoring and resistance to fading. Other objects and advantages of the invention will appear from the detailed description that follows.

The preferred embodiment of the invention comprises a friction composition including a strong, resilient friction compound and polymerized cashew-nut husk oil distributed throughout the said composition, advantageously, in the form of closely spaced small discrete particles. The invention comprises, also, such a composition reenforced with asbestos or like heat-resistant fibres either constituting a fabricated base into which the said composition is impregnated or being dispersed as individualized fibres throughout the composition. In a modification, the invention comprises a composition including a friction compound and friction granules of high wear-resistance dispersed in discrete form throughout the compound, the said granules including a conventional friction compound and polymerized cashew-nut husk oil.

A specific example of the invention is illustrated in the attached drawing and will be described in connection therewith.

Figure 1:
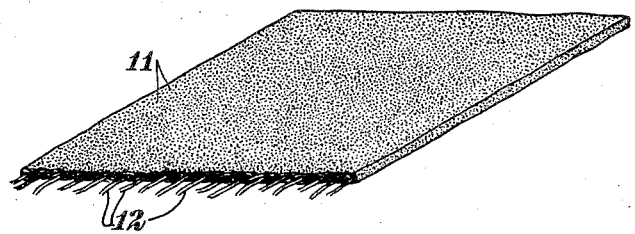
Fig. 1 shows a perspective view, partly diagrammatic, of a friction element constructed in accordance with the present invention.

In the embodiment illustrated in Fig. 1, the fibres are in the form of a fabricated base 12 and the friction composition is impregnated thereinto and coated thereover.

Figure 2:
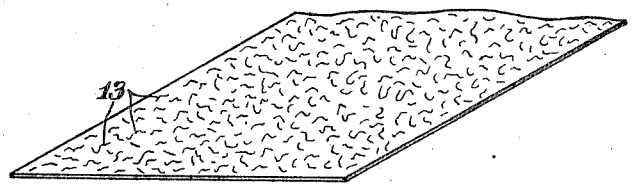
Fig. 2 shows a similar perspective view of another embodiment of the invention.

In the embodiment illustrated in Fig. 2, the fibres 13 are dispersed predominantly in individualized or discrete form throughout the friction composition.

In the friction materials of the present invention, heat resistant fibres of chrysotile, amosite, or other variety of asbestos fibres adapted for use in friction materials are used as the fibrous component associated with the friction composition 11. The friction composition is intimately associated with the fibres and has novel characteristics which will be described in detail below.

The friction composition includes cashew-nut oil. This oil, in form that is particularly suitable for the present purpose, is produced from the husk of the cashew-nut which, in turn, is understood to be a fruit of a bush or tree scientifically named *Anacardium occidentale*. The husk oil, before use in our improved composition, is subjected to treatment to increase the viscosity or decrease the plasticity thereof and to make a product that is substantially non-oxidizing and permanent under conditions to which it is exposed in friction elements. Thus, the oil obtained from the husk is polymerized or condensed with itself in the presence of a suitable promoter, of which promoter a small proportion of a mineral acid such as sulphuric, hydrochloric, or nitric is an example. The term "polymerized cashew nut husk oil" as employed herein designates products produced by the inter-combination of the molecules of such material with each other and does not include condensation products resulting from the condensation of such oil with other materials such as aldehydes. Thus, there may be used the product resulting from polymerizing or condensing cashew-nut husk oil with about three per cent of dilute sulphuric acid, usual technique for such acid treatment being employed, including usual steps, such as washing and/or neutralizing, insuring that the finished polymerized oil shall contain no substantial amount of free acid such as would corrode an iron or steel brake drum against which a friction composition including the polymerized product is applied.

The improved friction composition of our invention suitably comprises not only the polymerized cashew-nut husk oil, but also a strong, resilient friction compound in which the polymerized oil is dispersed. Thus, there may be used conventional rubber friction compound or one containing polymerized chloroprene of rubbery consistency, along with hardening, filler or other admixtures that are usual in friction compounds.

The making of the friction compound composition will be illustrated by a specific example in which a rubber friction compound is the one blended with the polymerized cashew-nut oil.

The selected rubber friction compound, in plastic condition, is kneaded or mixed thoroughly with the polymerized cashew-nut husk oil.

The composition in suitable form, say, at an elevated temperature and/or in the presence of a suitable proportion of a volatile solvent, such as gasoline or benzol, is then intimately associated with heat-resistant reenforcing fibres.

Thus, the composition in cement form may be impregnated into a woven asbestos fabric (Fig. 1).

In a modified method, the composition may be intimately mixed at an elevated temperature and in the presence of a small proportion of solvent with loose, non-fabricated, individualized fibres of asbestos or the like. This mixing may be done in a suitable mixing machine and the resulting mixture made more intimate and shaped on a sheeter, as, for example, in the process and with the equipment described in U. S. Patent 1,877,651 issued to Eisenhardt on September 13, 1932, for "a Process of making a brake lining and the like". The resulting product is of the type illustrated in Fig. 2.

After the composition has been intimately associated with the fibres, as in one of the methods described, the resulting article is cut or shaped to suitable dimensions and then is strongly compressed and hardened. The hardening is effected, suitably, by subjection of the article to an elevated temperature adapted to cause hardening of the friction compound used. In case the compound contains rubber, the hardening includes vulcanization.

The hardening may be conducted, for instance, at a temperature of 300 to 350° F. and for a period of time that may be 30 minutes or longer.

It will be understood that volatile solvent, if used in the process, is removed by evaporation before the hardening described.

Proportions of the several materials may be varied within limits, depending upon the properties desired in the finished product. In general, greater heat-resistance and higher coefficients of friction are obtained with increasing proportion of the polymerized cashew-nut husk oil. I have used to advantage compositions including approximately equal parts by weight of rubber and the polymerized oil along with sulphur, lead powder, powdered graphite and barytes.

With such a composition impregnated into a woven asbestos base and the product then hardened, I have found a coefficient of friction of approximately 0.5 as compared with a coefficient of friction of only approximately 0.3, when there was made a comparable commercial article without the use of the said polymerized husk oil. Furthermore, it has been found that the friction element including the polymerized oil has a satisfactory resistance to fading or excessive softening under conditions of use.

Figure 3:
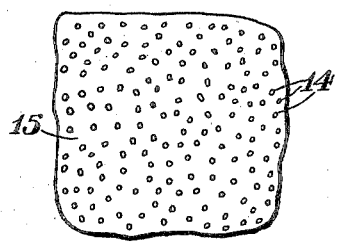
Fig. 3 shows a magnified view of a surface portion of the friction composition in the element illustrated in Figs. 1 or 2.

Careful examination of the friction element discloses that the composition, as made in the preferred manner, is not absolutely homogeneous but contains closely spaced discrete particles 14 (Fig. 3) of the polymerized cashew-nut husk oil dispersed throughout the rubber friction compound, the said compound, presumably, forming a matrix 15 that contributes substantially to the overall resiliency and strength. The particles are predominantly of size of the order of a common pin head or less.

If desired, a conventional friction compound, such as one including a large proportion of rubber, may be mixed with the polymerized cashew-nut husk oil and the resulting mixture formed into granules, for example, after being hardened. Such granules may then be incorporated with additional conventional friction compound and the composition produced may be intimately associated with the heat-resistant fibres, to give the element illustrated in Fig. 1 or in Fig. 2.

While the invention is not limited to any theory of explanation of the results obtained, it is believed that the discrete particles including the polymerized cashew-nut husk oil are either insoluble or incompletely soluble in the surrounding rubber friction compound or the like and, yet, are adapted to be thoroughly adhered or substantially integrally united over their exterior surfaces with the said compound. It appears probable, in view of our work, that there is partial solubility or superficial diffusion at the boundary portions between the said particles and the compound adjacent thereto.

The details that have been given are for the purpose of illustration, not restriction. It is intended, therefore, that variations within the spirit of the invention are to be included in the scope of the appended claims.

What we claim is:

1. A friction composition comprising polymerized cashew-nut husk oil and asbestos fibres in intimate association therewith.

2. A friction element comprising a heat-resistant fibres and a friction binder composition therefor including a matrix of a strong resilient friction material and polymerized cashew-nut husk oil distributed as closely spaced discrete particles throughout the said matrix.

3. A friction element comprising heat-resistant fibres and a friction binder composition therefor including a matrix of a rubber friction compound and polymerized cashew-nut husk oil distributed as closely spaced discrete particles throughout the said matrix.

4. A friction element comprising a heat-resistant fabric base and a friction binder composition impregnated thereinto and coated thereover, the said composition including a rubber friction compound and polymerized cashew-nut husk oil distributed as closely spaced discrete particles in the said compound.

5. A friction element comprising an intimate mixture of heat-resistant fibres and a friction composition including a rubber friction compound and polymherized cashew-nut husk oil distributed as closely spaced discrete particles throughout the said compound.

6. A friction element comprising an intimate mixture of asbestos fibres and a friction composition including a matrix of a rubber friction compound and friction granules of high wear-resistance distributed throughout the said compound, the granules including each a rubber friction compound and polymerized cashew-nut husk oil.

7. A brake lining characterized by a relative high coefficient of friction and absence of objectionable fading characteristics comprising a rubber compound, asbestos fibres, and polymerized cashew nut husk oil.

DONALD S. BRUCE.
RALPH T. HALSTEAD.